Figure 3:
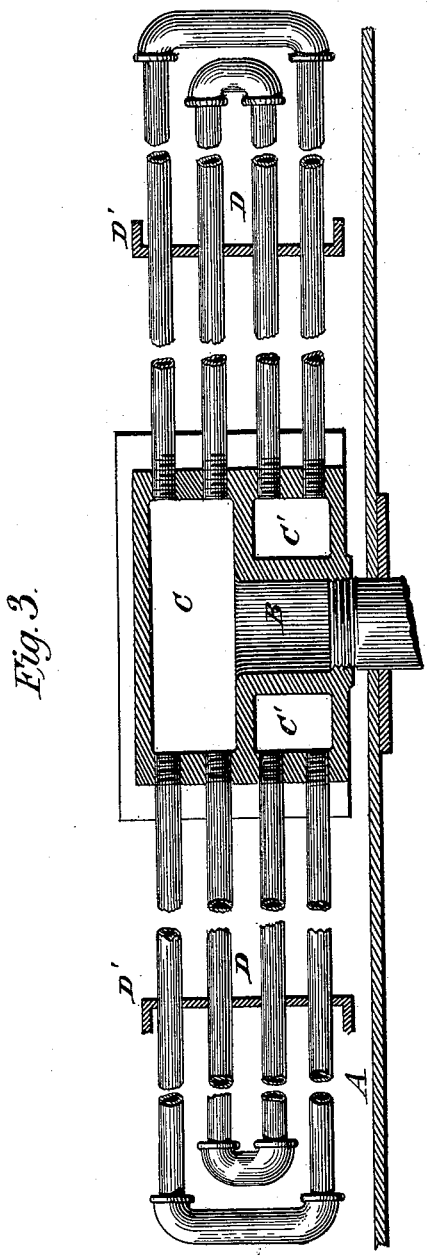

(No Model.) 2 Sheets—Sheet 1.
T. H. SAMPSON.
PROCESS OF PRESERVING LUMBER.
No. 403,144. Patented May 14, 1889.
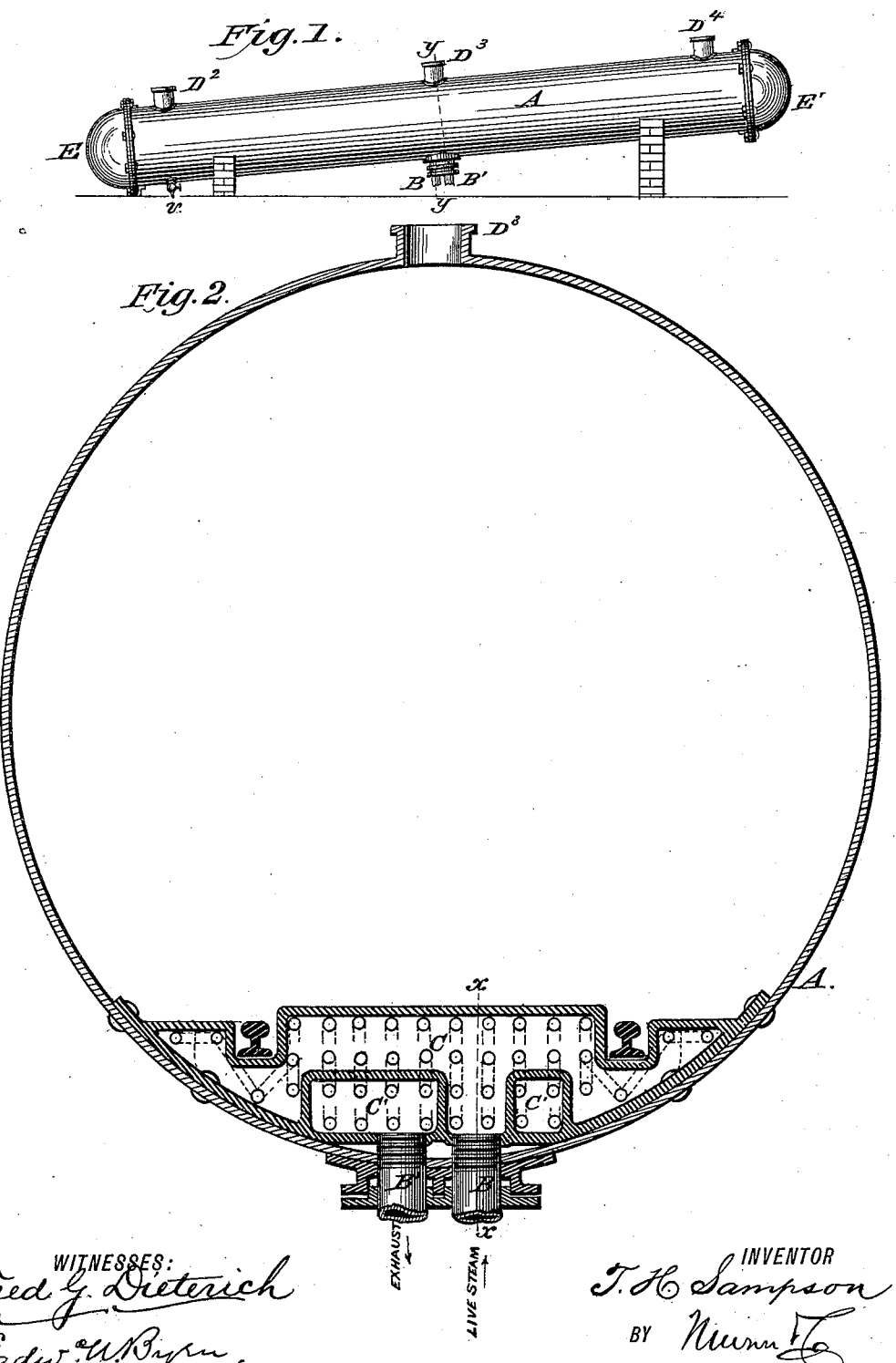

(No Model.) 2 Sheets—Sheet 2.

T. H. SAMPSON.
PROCESS OF PRESERVING LUMBER.

No. 403,144. Patented May 14, 1889.

WITNESSES:
Fred G. Dieterich
Edw. W. Byrn.

INVENTOR
T. H. Sampson
BY Munn & Co
ATTORNEYS.

UNITED STATES PATENT OFFICE.

THOMAS HARLOW SAMPSON, OF NEW ORLEANS, LOUISIANA.

PROCESS OF PRESERVING LUMBER.

SPECIFICATION forming part of Letters Patent No. 403,144, dated May 14, 1889.

Application filed May 5, 1888. Serial No. 272,991. (No model.)

*To all whom it may concern:*

Be it known that I, THOMAS HARLOW SAMPSON, of New Orleans, in the parish of Orleans and State of Louisiana, have invented a new and useful Improvement in Processes for Preventing Warping and Twisting of Lumber, of which the following is a specification.

The object of my invention is to utilize woods which are now useless for furniture-manufacturing purposes on account of their liability to warp and change their shape and position; and to this end it consists in a process for treating the woods, whereby they can be used as other cabinet woods are, thereby making woods which hitherto have been considered valueless except as fire-wood of great commercial use.

Figure 1 is a side elevation of an apparatus for carrying out my process. Fig. 2 is an enlarged central cross-section, and Fig. 3 a vertical longitudinal section through line $xx$ of Fig. 2.

A is an iron shell or cylinder of six feet diameter by one hundred feet long, with closing-heads E E', so as to allow the cylinder to be made air-tight. In the center of the bottom part of the cylinder is a cast-iron manifold-box, C C', which is fastened to the bottom of the shell, and one compartment of which, C, has an inlet, B, for live steam, and the other compartment of which, C', has a steam-exhaust, B'.

D are a series of pipes returned upon themselves and having one end connected with one compartment, C, and the other with the compartment C', so that steam may circulate therein throughout the lower portion of the cylinder. To the pipes B B' are connected boilers for furnishing steam at a pressure of one hundred and fifty pounds per square inch. By this arrangement I provide for heating the contents of the cylinder during the process. On the top of said cylinder there are three twelve-inch openings, D D' D², one to admit live-steam from the boilers to the cylinder, and the second to allow escape-steam of boiling to pass off, and the third to connect with the vacuum-pump and solution systems, hereinafter described.

The cylinder itself is given an inclination of one-half inch to the foot, having at lower end a six-inch opening and valve, v. The manifold is placed and riveted in the middle of the cylinder, so that the strains upon the manifold and cylinder-plates by constant cooling and heating will be evenly balanced, supports D' for the coils of pipes being placed at suitable intervals.

The process is as follows: The lumber or logs are placed on cars for the purpose and securely bolted or fastened upon the same and placed in the cylinder, that part of the wood which, while growing, was at the top of the tree being placed at the higher or upper end of cylinder, the lower or butt end of the wood or tree to be at the lower end of cylinder. The cylinder ends are then closed and bolted air-tight. The atmosphere and wood in the cylinder are heated to a temperature of not above one hundred and forty degrees (140°) Fahrenheit, as at that point the albuminous matters in the sap, which are the principal cause of the warping and twisting, will be coagulated, causing them to be deposited upon the sides of cells, insoluble in water, and thereby retained in the structure of the wood, which I wish to avoid. A vacuum being drawn in the cylinder just below this temperature, the liquid sap, together with its albuminous and vegetable matter, will boil and pass out of the wood, the process continuing till the vacuum-pump and gage show no more steam arising from the wood. In case the wood is already dry or seasoned, it is necessary to soak in water and absorb the moisture evaporated from it again, which has been lost by drying, and then pass it through the above process.

After the sap has been removed, as above described, and a vacuum is formed in cylinder, the wood is covered with a dilute solution of an alkali. Steam is then passed through the heating-coils and the wood is boiled in the solution and at a temperature the same as above—to wit, just below the coagulating point of the albuminous matter—for from two to twelve hours, according to the thickness of lumber, the vacuum-pump meanwhile sustaining the vacuum in the cylinder and taking away the escaping steam.

The cause of the warping and twisting of lumber is that in the cells or fibers of all woods (in some more than others) there is a certain amount of albuminous or vegetable matter not yet changed into the vascular or cellular tissue of true and mature woods. These albuminous substances on the sides of the cells, and which have been deposited there from the sappy matter already drawn out in the first part of process, are insoluble in water, but are nevertheless easily acted upon by water or dampness, causing the albuminous matter to swell or contract largely in excess of the fibers of the wood itself, according as there is more or less dampness in contact with the wood; but although these albuminous matters are insoluble and simply swell and contract by the presence of more or less dampness or water, upon making the water slightly alkaline they may be and are readily dissolved in it and enter into solution with it, and can then be expelled by boiling and a vacuum, as before mentioned. After the wood has been boiled in the dilute alkaline solution the latter is removed, and the wood is cooled to below boiling-point, but not dried. A vacuum is then formed in the cylinder, and a solution of a basic metallic salt is now introduced in its place and forced into the wood by a pressure of one hundred and fifty pounds per square inch for a period of from two to twelve hours, for the reason that albuminous matters are insoluble and precipitated in a solution of a basic metallic salt, and basic metallic salts are immediately precipitated from solution upon the addition thereto of different alkaline liquids. Consequently it follows upon the injection into the pores of the wood of the basic metallic salt solution and its coming in contact with the alkaline albuminous matters therein there will be an immediate precipitation of the salt and the albuminous matter in the solution upon the cells of the wood in an insoluble form and in a form unacted upon by water or moisture. The wood is then gradually dried in vacuum first and finally at a pressure of one hundred and fifty pounds in the cylinder and of the same pressure of steam in the coils, for the reason that lumber dried at this temperature is made much firmer in texture and less liable to be affected by moisture than when seasoned at a lower temperature.

To describe more minutely, I take as an alkali a dilute solution of ammonia, boil wood in it from two to twelve hours, as described, take out the alkaline liquid from cylinder, and put therein (after cooling down and drawing a vacuum, as described) a solution of acetate of aluminum made of two hundred pounds alum, one hundred and twenty-five pounds sugar of lead, and fifty gallons water. Inject this solution into the pores of the wood, as described, for from two to four hours.

The albuminous matters in the cells of the wood in a liquid state, together with the alumina, will be deposited as a colorless insoluble matter, unacted upon by the presence of moisture. I prefer the solution of ammonia and acetate of aluminum for the reason that the color of the wood is not changed.

Other alkalies—as of calcium, sodium, and potassium—may be used, as also other basic metallic salts—as of tin, chromium, lead, copper, iron, &c.; but these are more likely to change the natural color of the wood acted upon.

Woods can be colored to represent cherry by the addition of nine parts extract annotto and one part of Brazil wood to the dilute alkaline solution of ammonia; to represent mahogany, by the addition of one part madder extract to nine parts annotto extract; to represent walnut, by adding extract of catechu to the ammonia solution, and proceed as above described. The basic metallic salt acts as a mordant, setting the coloring-matter firmly into the texture of the wood. By using as an alkali a dilute solution of caustic soda and afterward injecting into the pores of the wood a dilute solution of ferrous sulphate, and using common ash or oak, the dark lines peculiar to old English oak are obtained.

Having thus described my invention, what I claim as new is—

1. The process of preventing the warping and twisting of lumber, which consists in first removing the sap, then dissolving the imperfectly-formed cellular tissue by an alkaline solution and extracting it by a vacuum, and finally precipitating the remaining matters in the wood in an insoluble state by a basic metallic salt and drying, substantially as described.

2. The process of preventing the warping and twisting of lumber, which consists in first removing the sap by heating the wood to a temperature below the coagulating point of the sap and extracting the same by a vacuum, then dissolving the imperfectly-formed cellular tissue by an alkaline solution and extracting it by a vacuum, then precipitating the remaining matters in the wood in an insoluble state by a basic metallic salt and drying, substantially as described.

3. The process of preventing the warping and twisting of lumber, which consists in first removing the sap by heating the wood to a temperature below the coagulating point of the sap and extracting the latter by a vacuum, then dissolving the imperfectly-formed cellular tissue by an alkaline solution and extracting it by a vacuum, then precipitating the remaining matters in the wood in an insoluble state by a basic metallic salt, and finally drying the wood first in a vacuum and then under pressure, substantially as and for the purpose described.

THOMAS HARLOW SAMPSON.

Witnesses:
EDW. W. BYRN,
SOLON C. KEMON.